Sept. 8, 1959  J. HENDERSON  2,903,304
ENDLESS BANDS
Filed Feb. 6, 1956  5 Sheets-Sheet 1
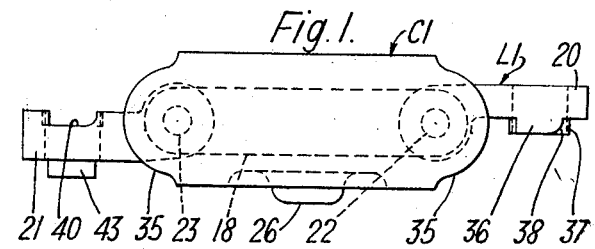
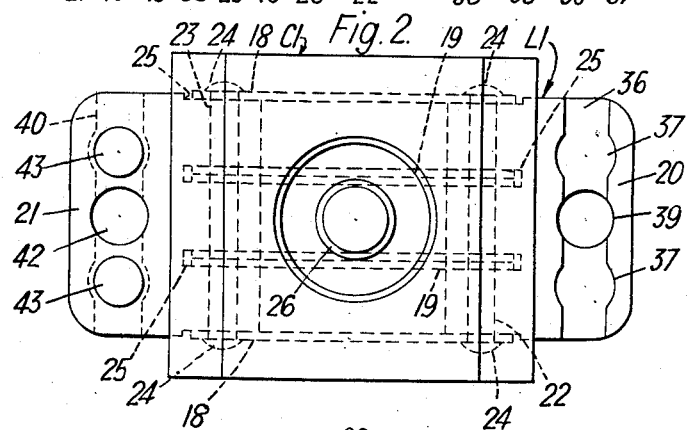
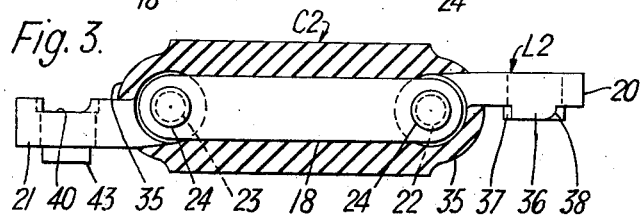
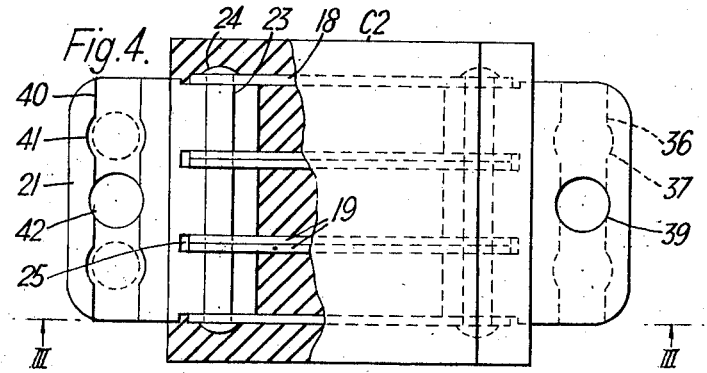
Inventor:
JOHN HENDERSON
By
Richardson, David and Nordon
Attorneys Sept. 8, 1959  J. HENDERSON  2,903,304
ENDLESS BANDS
Filed Feb. 6, 1956   5 Sheets-Sheet 2
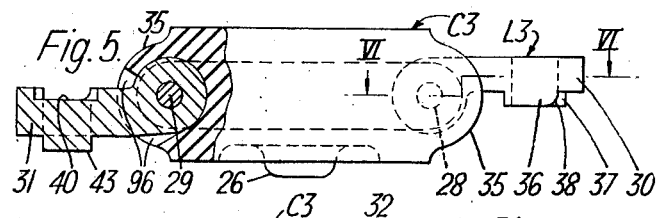
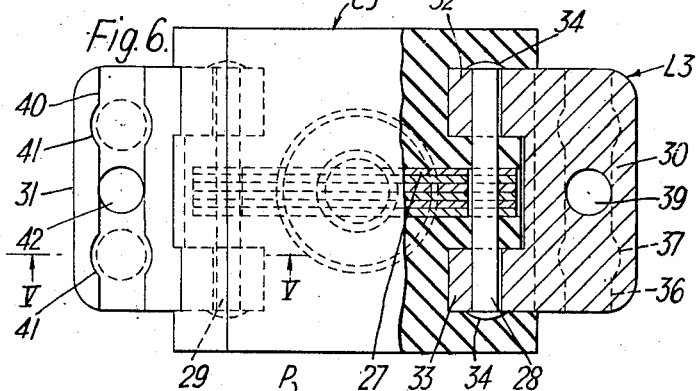
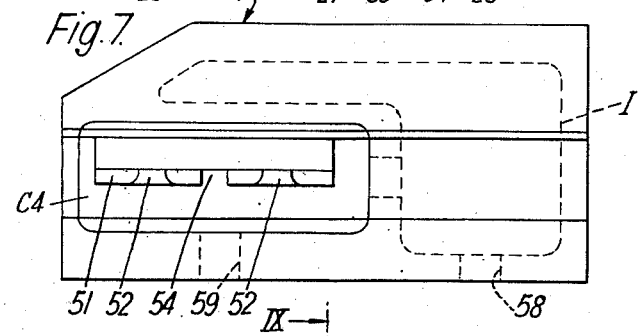
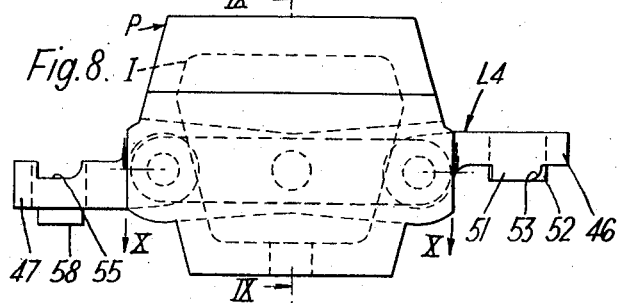
Inventor:
JOHN HENDERSON
By Richardson, David and Nordon
Attorneys

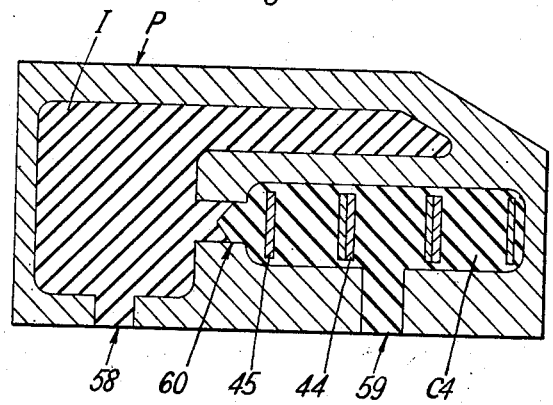
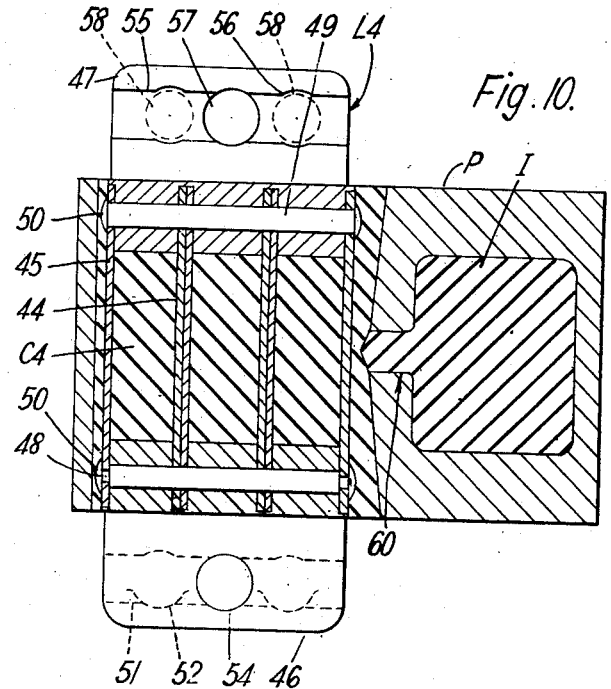

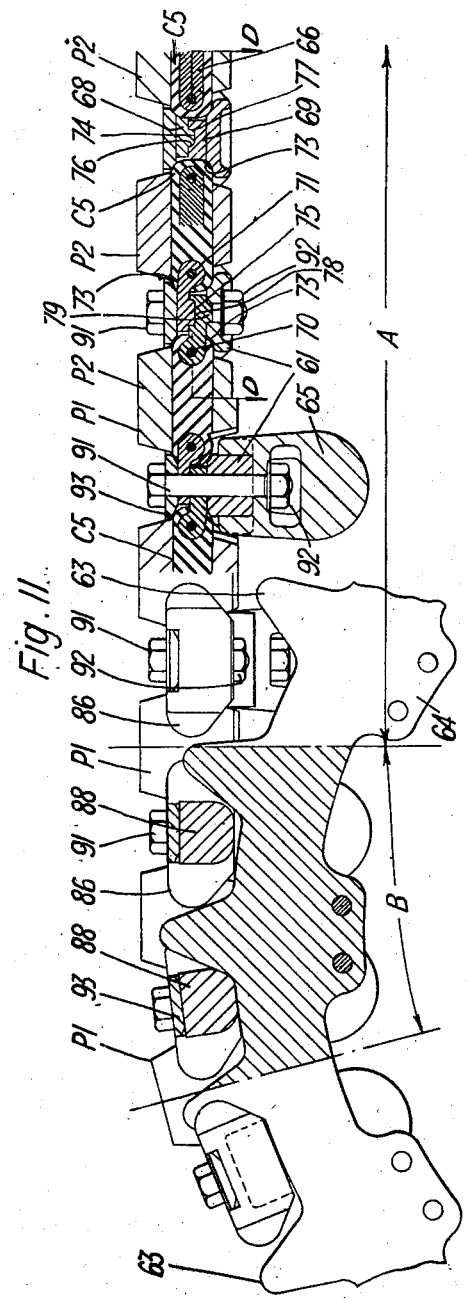

Sept. 8, 1959 J. HENDERSON 2,903,304
ENDLESS BANDS
Filed Feb. 6, 1956 5 Sheets-Sheet 5

Inventor:
JOHN HENDERSON
By
Richardson, David and Nordon
Attorneys.

2,903,304

ENDLESS BANDS

John Henderson, Walsall, England, assignor to Atkinson's Agricultural Appliances Limited, Clitheroe, England, a British company Application February 6, 1956, Serial No. 563,773

Claims priority, application Great Britain March 10, 1955

8 Claims. (Cl. 305—57)

This invention relates to endless bands, such as conveyors and endless tracks.

Among the objects of the invention is the provision of endless bands incorporating transverse hinge-axes which are protected from corrosive agents without detriment to their hinging efficiency; which are built up from readily assembled components which can rapidly and easily be replaced when necessary; wherein snaking or lateral deviation is obviated or mitigated; and which are substantially non-stretching in the longitudinal direction.

The present invention is a method of producing a hinge-accommodating component for an endless band comprising coring a pad or block of material, preferably of a wear-resistant nature, to provide therein at least one longitudinal through opening, and filling each said opening with a cushion of flexible resilient material rendered substantially unextensible by internal reinforcement means to each end of which is hingedly connected, about a transverse axis within the cushion, a lug which emerges from the cushion and projects to the pad or block exterior.

The reinforcement means may be bonded to the cushion material and preferably comprises a plurality of longitudinal plate links approaching close to the ends of the cushion and mounted between two transversely-extending pins mounting also the lugs and permitting hinging movement of the latter relative to the links.

Preferably, also, the upper surface of one lug is coplanar with the lower surface of the other when both are disposed in the mean position, and said co-planar surfaces have complementary inter-engaging recess and projection features adapted positively to interlock the lugs against movement in the plane of said surfaces relative to the complementary lugs of adjacent components in a longitudinal series of components fitted together with adjacent lugs in superimposed relationship.

The pad or block may be additionally cored to receive one or more inserts of mouldable material moulded in position using the pad or block as an injection mould and each such insert and core preferably has complementary inter-engaging features adapted positively to key or interlock the insert in position.

The present invention is also an endless band comprising a longitudinal series of transversely-extending driving bars and at least one longitudinal series of hinge-accommodating components which alternate with said driving bars, said hinge accommodating components each comprising a pad or block of material, preferably of a wear-resistant nature, jacketing one or more cushions of flexible resilient material each penetrating the pad longitudinally and rendered substantially unextensible by internal, longitudinally-extending, reinforcement means to each end of which is hingedly connected, about a transverse axis within the cushion, a lug which emerges from the cushion and is secured to the adjacent driving bar.

The reinforcement means may be bonded to the cushion material.

Preferably, adjacent lugs of successive hinge-accommodating components in each series of the latter overlap one another on the running-wheel remote surface of the intermediate driving bar.

Preferably, also, the contiguous surfaces of the mutually overlapped lugs are provided with complementary recess and projection features which key or interlock the lugs together against relative movement in the plane of said surfaces.

Embodiments of the invention will now be described, by way of example, with reference to the accompanying drawings in which:

Figs. 1 and 2 are, respectively, a side elevation and a reverse plan view of an unextensible linkage means embedded throughout the greater part of its length in a cushion of flexible, resilient material;

Figs. 3 and 4 are, respectively, a side sectional elevation on the line III—III of Fig. 4, and a plan view partly in horizontal section of the unextensible linkage means with a modified cushion;

Figs. 5 and 6 are, respectively, a side elevation, partly in section on the line V—V of Fig. 6, and a plan view, partly in section on the line VI—VI of Fig. 5, of a modified unextensible linkage means with a further modified cushion;

Figs. 7 to 10 are, respectively, an end elevation, a side elevation, an end sectional elevation on the line IX—IX of Fig. 8, and a sectional plan view on the line X—X of Fig. 8, of a pad or block designed for an endless track and cored to accommodate an unextensible linkage means and a cushion of flexible, resilient material in which the greater part of the length of the linkage means is embedded;

Fig. 11 is a side elevation, with parts in section along the lines A—A and B—B of Fig. 12, of an endless track incorporating pads or blocks constructed in accordance with the invention;

Figures 12, 13:
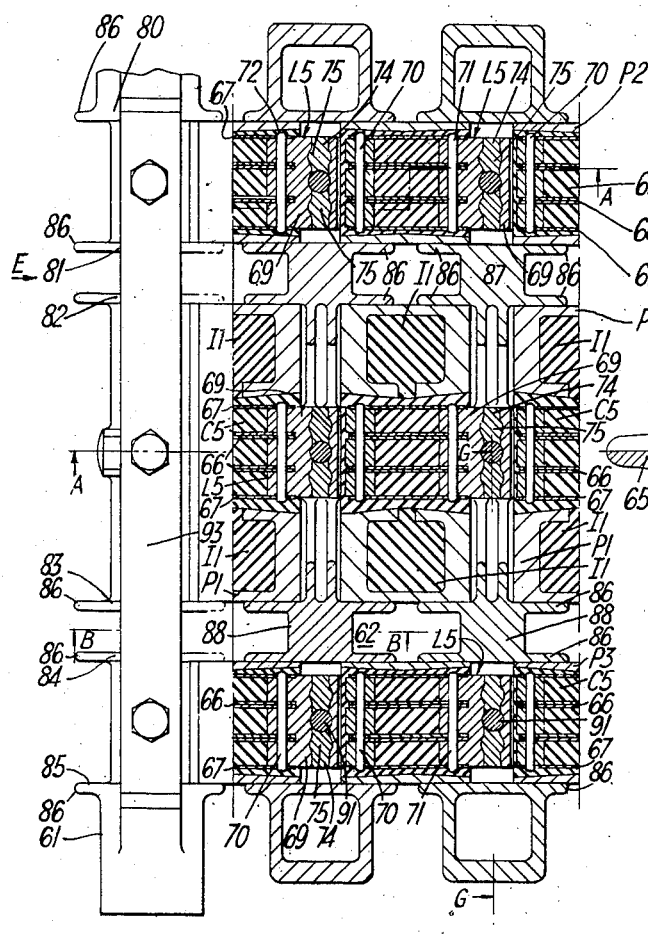
Fig. 12 is a plan view of the endless track, partly in section along the line D—D of Fig. 11.
Fig. 13 is a part end elevation in the direction of arrow E of Fig. 12, and part sectional view on the line G—G of Fig. 12, of the endless track.

Referring now to the drawings, Figs. 1 to 6 illustrate unextensible linkage means for incorporation in pads or blocks for endless tracks, or components for endless band conveyors. In Figs. 1 and 2 the unextensible linkage means L1 comprises outer and inner vertical, parallel plate links 18 and 19, respectively, a pair of end connector lugs 20 and 21, and transverse, parallel hinge pins 22 and 23. The lugs and links are apertured to permit passage of the hinge pins, the ends of which are riveted at 24 to the outer links 18. The lugs are each provided with vertical slots 25 into which enter the ends of the inner links 19.

The linkage means L1 is of metal and is embedded throughout the greater part of its length in a cushion C1 of a flexible, resilient material capable of bonding to the metal. A feature of the invention is that the cushion C1 is of sufficient length to envelop and thus effectively seal off the two hinge axes in order completely to prevent access thereto of water and other corrosive agents.

The cushion C1 has rounded ends 35 for a purpose which will become apparent as this description proceeds, and is formed with a locating key 26 for co-operation with a complementary key in a pad, block or casing designed to accommodate the cushion C1. Manifestly the key 26 is shown simply by way of example and may be provided also on the upper surface of the cushion and/or on one or both of the side surfaces thereof, and may moreover be in the form of lateral and/or longitudinal ribs, possibly combined with the form of key illustrated.

Referring now to Figs. 3 and 4, the linkage means L2 corresponds precisely to the linkage means L1, and the cushion C2 corresponds to the cushion C1 with the exception that it is not formed with a key.

Referring now to Figs. 5 and 6, the linkage means comprises six juxtapositioned, vertical plate links 27 apertured to permit passage of parallel hinge pins 28 and 29 and disposed centrally of the latter, and a pair of lugs 30 and 31 each formed with spaced arms 32 and 33 also apertured to permit passage of the hinge pins, the ends of the hinge pins being riveted to the arms at 34. The linkage means L3 is embedded throughout the greater part of its length in a cushion C3 of flexible, resilient material and this cushion envelops both hinge axes of the linkage means. It will be readily observed that the cushion C3 is similar to the cushion C1, but is cored out at 96 at each of its ends where the arms 32 and 33 of the lugs enter same to permit free hinging movement of the lugs and hinge pins relative to the plate links 27.

Turning now to the lugs which form part of the linkage means in the three constructions described, it will be observed that these project from the enveloping cushion, and the reason for this is that these lugs are designed for the fitment into endless tracks or endless conveyor bands or the like, of pads, blocks or casings accommodating the linkage means and cushion assemblies as will be hereinafter described.

The right-hand lugs 20 (Figs. 1 to 4) and 30 (Figs. 5 and 6) are male lugs, being formed on one surface (the underneath surface in the views shown) with a transverse ridge 36 projecting outwardly therefrom and provided widthwise with local enlargements 37. The outer edge of the ridge is curved as shown at 38, and a bolt hole 39 is provided in each male lug centrally of the ridge.

The left-hand lugs 21 (Figs. 1 to 4) and 31 (Figs. 5 and 6) are female lugs, being formed in their upper surfaces with channels 40 locally widened at 41 and completely complementary to the ridges 36 and local enlargements 37 of the male lugs. A bolt hole 42 is provided in each female lug centrally of the channel and is of the same diameter as the bolt hole 39. The bolt holes 39 and 42 are axially aligned when male and female lugs of adjacent linkage means are fitted together, these lugs being then interlocked or keyed together against movement in a plane cutting normally the axis of the aligned bolt holes. The female lugs 21 and 31 are also provided on their non-channelled surfaces with a pair of projecting studs 43, one on each side of the bolt hole 42, for a purpose which will be described hereafter.

Referring now to Figs. 7 to 10, the block or pad P is of aluminium and is cored to receive a linkage means and cushion assembly similar to these hereinbefore described. The linkage means L4 comprises inner and outer parallel, vertical plate links 44 and 45 respectively, male and female end lugs 46 and 47 respectively, and transverse, parallel hinge pins 48 and 49 riveted to the outer links at 50. The linkage means L4 is embedded throughout the greater part of its length in the cushion C4, only the lugs 46 and 47 emerging therefrom.

The lugs 46 and 47 are of the construction hereinbefore described, the lugs 46 being formed on its underneath surface with a transverse ridge 51 projecting outwardly therefrom and provided widthwise with local enlargements 52. The outer edge of the ridge is curved as shown at 53 and a bolt hole 54 is provided centrally of the ridge.

The lug 47 is formed in its upper surface with a transverse channel 55 locally widened at 56 and completely complementary to the ridge 51, 52 of the lug 46. A bolt hole 57 is provided in the lug 47 centrally of the channel and is of the same diameter as the bolt hole 54. The lug 47 is moreover provided on its under surface with a pair of projecting studs 58, one on each side of the bolt hole.

The pad P is also cored, to receive an insert I of mouldable material, preferably flexible, resilient material. The insert I is not an essential fleature of the invention but may in certain cases be advantageous, as it provides a means whereby the pad or block may be made lighter without loss of strength, and provides a saving of the pad or block material which may be considerable in a complete endless track or endless conveyor band.

The assembly of the linkage means L4 and cushion C4 may be a separately formed insert as illustrated in Figs. 1 to 6, in which case the cored-out section of the pad P is extended laterally to penetrate the adjacent side wall of the pad, the assembly being then inserted into the pad simply by pushing same laterally into the cored-out section from the side of the pad. With this form of pad, the driving bars in the case of endless tracks, or other pad-interspacing element in the case of endless conveyor bands, is provided with an ear or flange which at least partly closes the pad side opening as will be described hereinafter.

The cushion C4 and insert I in the embodiment illustrated in Figs. 7 to 10 are not separately formed inserts, but are moulded in position using the pad P itself as an injection mould.

Two openings 58 and 59 communicating with the cored-out sections of the pad P are provided for injecting the flexible, resilient material into the pad. This material may be hard rubber, although if desired two different materials may be provided, one for the cushion C4 and the other for the insert I. The latter may, for instance, be a soft, bonding rubber, in which case the passage 60 communicating between the cored-out sections for the cushion and insert is blanked off before the soft rubber is injected.

If desired insert I may be a material resistant to distortion and fragmentation and capable of providing the ground-engaging surface of the pad P in an endless track when the pad material has worn away to such an extent that the adjacent surface of the insert is exposed. Hard rubber is a suitable material for the insert I in this case, and the insert I and the cored-out section of the pad are preferably adapted to interlock one with the other by the provision of keys or the like, whereby the insert is positively held in position when exposed due to wear of the ground-engaging surface of the pad.

The cushion C4 is bonded to the linkage means L4 and is keyed in position within the pad P as shown in Fig. 10 to prevent relative longitudinal movement of cushion and pad.

Since all stresses set up in running the endless track or conveyor band are transmitted through the linkage means the pad P or other casing component could be of a wide selection of materials. When incorporated in an endless track the pad P undergoes compressive strains only. The material of the pad P or other casing component should preferably be resistant both to water and to fragmentation and should have good wearing properties. It is moreover desirable that the pad material should be non-abrasive and heat-resistant. Metals such as aluminium, aluminium bronze, and manganese steel, and materials of the class known as asbestos base, solid weave, metallic friction materials, are examples of suitable pad materials.

Aluminium bronze is a particularly suitable pad material for endless tracks on military vehicles as its tensile strength is substantially unimpaired at high temperatures and is increased at low or sub-zero temperatures.

Figs. 11 to 13 illustrate an endless track for a self-laying track vehicle utilising pads of the construction hereinbefore described, although of different design. While the applicants have elected to show and describe an endless track it is to be understood that the invention applies also to endless conveyor bands, which are basically similar in construction to endless tracks and need not therefore be specifically shown and described.

The endless track shown in Figs. 11 to 13 comprises a longitudinal series of transversely-extending driving bars 61 and three longitudinal series of pads or blocks disposed parallel to one another with the pads P1, P2 and P3 of each series alternating in the longitudinal direction of the track with the driving bars.

The series of pads P1 is centrally disposed along the track, and the series of pads P2 and P3 are disposed one along each side of the track, each being spaced laterally from the central series leaving spaces 62 for the reception of the teeth 63 of a driving sprocket 64. It will be apparent that the track is designed for a vehicle provided with twin driving sprockets 64 and twin sets of bogie wheels (not shown) which run over the surfaces of the central series of pads P1 on each side of the track median plane along which are disposed guides 65 mounted on the driving bars 61.

The blocks or pads P1, P2 and P3 are cored to receive centrally of their widths a linkage means and cushion assembly as hereinbefore described. The linkage means L5 comprises inner and outer parallel, vertical plate links 66 and 67 respectively, male and female end lugs 68 and 69 respectively and transverse parallel hinge pins 70 and 71 riveted to the outer links at 72. Each linkage means L5 is embedded throughout the greater part of its length in a cushion C5, the hinges being so embedded and the lugs alone projecting from the cushion at each end thereof. The length relationship between the pads and the cushions is such that the ends of the latter project from each end of the former, and these projecting ends of the cushions are partly rounded in vertical section as shown at 73.

The male lugs 68 are each formed on their inner surface with a transverse ridge 74 locally enlarged widthwise at 75 and having a curved edge 76 remote from the related cushion C5. In the track description the terms "inner" and "outer," and related terms, are to be construed as referring to positions of parts of the track relative to the bogie wheels of a self-laying track vehicle on which the track is mounted. A bolt hole is provided in each of the male lugs centrally along the length of the ridge 74.

The female lugs 69 are each formed on their outer surface with a transverse channel 77 locally widened at 78 and completely complementary to the ridge 74, 75 of the male lugs 68. A bolt hole is provided in each of the lugs 69 centrally along the length of the channel 77, and a pair of studs 79 project inwardly from the inner surface of each lug 69, one on each side of the bolt hole.

The side pads P2 and P3 are of restricted width relative to the central pads P1 and the latter are provided with two inserts I1 similar to the insert I in the Figs. 7 to 10 construction. The inserts I1 and the cushions C5 of the central pads P1 are moulded in position using the pads P1 as injection moulds.

The cushions of the side pads P2 and P3 may likewise be moulded in position or may be separately formed inserts pushed into place laterally of the pads.

Each driving bar is provided on its outer surface with six transversely-extending, vertical flanges 80–85 spaced apart along the length of the bar and symmetrically disposed with reference to the transverse central axis of the bar. Each of the flanges 80–85 is longer than the bar is wide and projects beyond both sides of the latter forming ears 86 which merge into said sides. The flanges 82 and 83, which are closest to the transverse central axis of the bar and equidistant therefrom, are spaced apart an amount equivalent to the width of a pad P1. The flanges of the corresponding pairs, 80 and 81 on the one hand and 84 and 85 on the other hand, are spaced apart an amount equivalent to the width of a pad P2 or P3.

Each driving bar is locally deepened at 87 between the flanges 81 and 82 and at 88 between the flanges 83 and 84 to provide wear sections which enter into the inter-teeth recesses of the driving sprockets 64 when the track is being laid by a self-laying track vehicle.

Each of the three pad-co-operating sections of each driving bar is provided centrally of its length and width with a bolt hole 89 of the same diameter as the bolt holes in the lugs 68 and 69, and, to each side of the bolt hole, each of said driving bar sections is provided with holes or recesses 90 spaced apart the same amount as the studs 79 of the female lugs 69 and dimensioned to be engaged neatly by said studs.

The pads P1 and P2 are omitted in the elevational part of Fig. 13, only the outlines thereof being indicated in chain-dotted lines, and the positions of the two driving sprockets of the vehicle relative to the track are indicated by the chain-dotted lines S. The driving bars 61 have flutes or hollows at their ends and on each side of their central lug-co-operating sections, such flutes or hollows being provided for the purpose of reducing the weight of the bars without detracting from their mechanical strength, i.e. the flutes and hollows are provided only where additional material would be superfluous.

The assembly of the endless track will be apparent from the foregoing description of the various components, the driving bars extending transversely of the track and alternating with the pads of each of the three pad series.

The successive pads of each series engage with one another through the intermediary of the lugs which overlap one another, the female lug 69 in each case being innermost and the channel 77, 78 thereof engaging over the ridge 74, 75 of the male lug 68. By virtue of the channel and recess complementary formations, the lugs are interlocked or keyed together against movement in a plane cutting normally the axis of the thus aligned bolt holes of the two lugs. The pads of each series thus form a continuous chain and the forces set up when the track is being laid are transmitted through the linkage means of the three chains thus formed the pad material being relieved of such forces and undergoing compressive strains only.

The driving bars 61 are disposed across the inner faces of the female lugs of the three series of pads, the holes or recesses 90 engaging over the studs 79 of the female lugs. The bolt holes 89 of the driving bars are constantly aligned with the bolt holes of the lugs. A tension plate 93 is mounted across the outer surface of each driving bar and the lugs are consequently sandwiched between the plates and the bars. Each plate is provided with bolt holes which coincide with the aligned bolt holes of the bar and lugs, and the shanks of bolts 91 are passed through the three aligned bolt holes and secured in position by nuts 92. The bolts and nuts are preferably of high tensile steel.

When the track described is being laid by a self-laying track vehicle all hinging movement necessary, e.g. when the track travels around the sprockets, takes place very readily about the hinge pins embedded in the cushions of the hinge-accommodating components, the driving bars accommodating themselves to the pitch of the sprockets with no undue expenditure of force on the part of the latter. As a result there is no undue wear of the sprocket teeth or wear sections of the driving bar, and the pitch of the track about the sprockets remains substantially constant in running of the vehicle.

The flanges 80–85 serve as positioning members for the pads or blocks and retain the cushions in place where the latter are separately-formed inserts. An important function of the flanges, however, is that they take the thrusts of the continuous chains hereinbefore referred to and transmit this towards the ground over which the vehicle is running. This promotes lateral stability of the track, tending to keep the ground-adjacent section of same flat, a very desirable condition when the vehicle is turning.

The tension plates 93 may, if desired, be adapted to engage with the lugs 68 in the same manner as the driving bars engage with the lugs 69.

The transversely-aligned pads P1, P2 and P3 of each series may be made unitary with one another to provide continuous ground-engaging surfaces, the interconnecting sections of the resultant single pad being restricted in depth and the inner surfaces thereof abutting the outer surfaces of the ears 86 of the flanges.

The rounded ends 73 of the cushions swivel between the driving bars and tension plates on hinging of the track and thus serve to take the load off the hinge pins 70 and 71.

I claim:

1. An endless band comprising a longitudinal series of transversely-extending driving bars and at least one longitudinal series of hinge-accommodating components, said driving bars alternating with and being interspaced by the hinge-accommodating components of each said series thereof in the longitudinal direction of the track; said hinge-accommodating components each comprising a block of wear-resistant material having a longitudinally-extending through opening therein, a cushion of flexible resilient material of shape and volume complementary to said through opening, said cushion being housed within and filling said through opening, complementary interengaging means in and on the contiguous surfaces repectively defining said through opening and the cushion volume preventing relative longitudinal displacement of the block and the cushion, longitudinally-extending reinforcement means embedded in said cushion rendering the latter substantially unextensible, said reinforcement means being of lesser length than said cushion and disposed substantially centrally of the length of said cushion, and lugs at each end of said block, each lug projecting from said block at an end thereof and entering said block through said opening, each lug being hingedly connected about a transverse axis within the cushion to the adjacent end of said reinforcement means; and means securing the block-external portion of each lug to the adjacent driving bar in the band.

2. An endless band as claimed in claim 1 in which said reinforcement means is bonded to the material of said cushion.

3. An endless band comprising a longitudinal series of transversely-extending driving bars, a longitudinal series of transversely-extending tension plates, and at least one longitudinal series of hinge-accommodating components, said driving bars and tension plates being mutually superimposed to complement one another and together alternating with and being interspaced by the hinge-accommodating components of each said series thereof in the longitudinal direction of the track; said hinge-accommodating components each comprising a block of wear-resistant material having a longitudinally-extending through opening therein, a cushion of flexible resilient material of shape and volume complementary to said through opening, said cushion being housed within and filling said through opening, complementary interengaging means in and on the contiguous surfaces defining said through opening and the cushion volume preventing relative longitudinal displacement of the block and the cushion, longitudinally-extending reinforcement means embedded in said cushion rendering the latter substantially unextensible, said reinforcement means being of lesser length than said cushion and disposed substantially centrally of the length of said cushion, and lugs at each end of said block, each lug projecting from said block at an end thereof and being hingedly connected about a transverse axis within the cushion to the adjacent end of said reinforcement means; each said driving bar being channeled to accommodate and provide seatings for the projecting portions of the adjacent lugs of the adjacent blocks of each series of the latter; said driving bars, tension plates, and projecting lug portions having aligned bolt holes, bolts traversing said bolt holes, and nuts securing said bolts in position.

4. An endless band as claimed in claim 3, in which said seating are channeled in the surfaces of the driving bars to be remote from running wheels about which the band is adapted to be trained and the projecting portions of adjacent lugs of successive hinge-accommodating components in each series of the latter overlap one another in said seatings.

5. An endless band as claimed in claim 4, in which complementary recess and projection features are provided in and on the contiguous surfaces of the mutually overlapped lug projecting portions said features interlocking said projecting portions together against relative movement in the plane of said surfaces.

6. An endless band as claimed in claim 5, in which complementary recess and projection features are provided in and on the contiguous surfaces of the projecting portions of the lugs and the driving bars, said features positively locating said projecting portions and said driving bars relative to one another.

7. An endless band as claimed in claim 6, in which the surfaces of the blocks and of the driving bars to be adjacent running wheels about which the band is adapted to be trained are substantially co-extensive in the longitudinal direction.

8. An endless band comprising a longitudinal series of transversely-extending driving bars and at least one longitudinal series of hinge-accommodating components, said driving bars alternating with and being interspaced by the hingle-accommodating components of each said series thereof in the longitudinal direction of the track; said hinge-accommodating components each comprising a block of wear-resistant material having a longitudinally-extending through opening therein, a cushion of flexible resilient material of shape and volume complementary to said through opening, said cushion being housed within and filling said through opening, complementary interengaging means in and on the contiguous surfaces defining said through opening and the cushion volume preventing relative longitudinal displacement of the block and the cushion, longitudinally-extending reinforcement means embedded in said cushion rendering the latter substantially unextensible, said reinforcement means being of lesser length than said cushion and disposed substantially centrally of the length of said cushion, and lugs at each end of said block, each lug projecting from said block at an end thereof and entering said block through said opening; each lug being hingedly connected about a transverse axis within the cushion to the adjacent end of said reinforcement means; means securing the block-external portion of each lug to the adjacent driving bar in the band; and flanges on each driving bar longer than the driving bar is wide, said flanges projecting both fore and aft of the driving bar, the number and position of said flanges being such that the parts thereof projecting fore and aft of the driving bar flank the adjacent blocks of the hinge-accommodating components of each series thereof.

References Cited in the file of this patent

UNITED STATES PATENTS

| | | |
|---|---|---|
| 2,332,976 | Saurer et al. | Oct. 26, 1943 |
| 2,761,745 | Atkinson | Sept. 4, 1956 |
| 2,796,302 | Atkinson | June 18, 1957 |
| 2,796,303 | Atkinson | June 18, 1957 |